US012611701B2

(12) United States Patent
White et al.

(10) Patent No.: US 12,611,701 B2
(45) Date of Patent: Apr. 28, 2026

(54) TREATING A FLUID CONDUIT

(71) Applicant: DEMPA HOLDINGS LTD, Macclesfield (GB)

(72) Inventors: Anthony Stephen White, West Bridgford (GB); Jonathan Francis Lee, Stockport (GB)

(73) Assignee: DEMPA HOLDINGS LTD, Macclesfield (GB)

( * ) Notice: Subject to any disclaimer, the term of this patent is extended or adjusted under 35 U.S.C. 154(b) by 60 days.

(21) Appl. No.: 18/287,283

(22) PCT Filed: Apr. 21, 2022

(86) PCT No.: PCT/GB2022/050999

§ 371 (c)(1),
(2) Date: Oct. 17, 2023

(87) PCT Pub. No.: WO2022/223971

PCT Pub. Date: Oct. 27, 2022

(65) Prior Publication Data

US 2024/0198396 A1 Jun. 20, 2024

(30) Foreign Application Priority Data

Apr. 23, 2021 (GB) ...................................... 2105801

(51) Int. Cl.

*B08B 9/032* (2006.01)
*B08B 17/02* (2006.01)
*B67D 1/07* (2006.01)

(52) U.S. Cl.

CPC ............ *B08B 9/0325* (2013.01); *B08B 17/02* (2013.01); *B67D 1/07* (2013.01)

(58) Field of Classification Search

None
See application file for complete search history.

(56) References Cited

U.S. PATENT DOCUMENTS 5,863,345 A * 1/1999 Talley .................... C11D 3/046 510/238

FOREIGN PATENT DOCUMENTS

EP 0667834 B1 6/2000
EP 1281674 B1 5/2003
(Continued)

OTHER PUBLICATIONS

European Patent Office; International Searching Authority; International Search Report and Written Opinion; Application No. PCT/GB2022/050999 filed Apr. 21, 2022; mailed Oct. 27, 2022; pp. 1-12 (2022).

*Primary Examiner* — Kaj K Olsen
*Assistant Examiner* — Pradhuman Parihar
(74) *Attorney, Agent, or Firm* — FisherBroyles, LLP; Kevin D. Jablonski

(57) ABSTRACT

A kit of parts and a method for cleaning a fluid conduit. The kit of parts comprises a device comprising: a coil configured to be positioned around the fluid conduit; and a controller in electrical connection with the coil. The kit of parts also comprises a powder composition comprising sodium percarbonate, sodium metasilicate, sodium carbonate, and ethylenediaminetetraacetic acid (EDTA), the powder composition configured to form a disinfecting and water softening cleaning solution when dissolved in a liquid within the conduit. The controller is configured to, in use, supply a varying electrical signal to the coil to generate a corresponding varying strength magnetic field within the fluid conduit having a solution of the powder composition therein for causing cleaning of the fluid conduit.

15 Claims, 5 Drawing Sheets

(56) References Cited

FOREIGN PATENT DOCUMENTS

| | | | | |
|---|---|---|---|---|
| EP | 1846334 | A1 | 10/2007 | |
| EP | 2052793 | A1 * | 4/2009 | ............. B08B 9/027 |
| EP | 2178425 | B1 | 6/2011 | |
| EP | 2624970 | A1 | 8/2013 | |
| EP | 2064155 | B1 | 4/2015 | |
| GB | 2294416 | A | 5/1996 | |
| GB | 2367106 | B | 3/2002 | |
| GB | 2409503 | A | 6/2005 | |
| GB | 2494417 | A | 3/2013 | |
| GB | 2550107 | A | 11/2017 | |
| WO | 2006072125 | A1 | 7/2006 | |
| WO | 2008035051 | A3 | 3/2008 | |

* cited by examiner

TREATING A FLUID CONDUIT

CROSS-REFERENCE TO RELATED APPLICATIONS

This application is national phase filing of PCT application No. PCT/GB2022/050999 filed Apr. 21, 2022, entitled “Treating a Fluid Conduit”, which claims the benefit of priority from Great Britain Patent Application No. 2105801.1 filed Apr. 23, 2021, both of which are incorporated herein by reference.

FIELD OF INVENTION

The present invention relates to treating a fluid conduit, such as a conduit for conveying beverages. Some examples disclosed herein relate to a device and a solution which may be used to clean, and maintain cleanliness of, a fluid conduit.

INTRODUCTION

It can be important to keep fluid conduits clean. For example, in food and drink applications, contaminants may enter a fluid conduit, may be deposited inside the conduit, or may develop inside the conduit through use. Such contaminants may include bacteria, biofilms (e.g. a mixture of proteins, bacteria, carbohydrates and/or yeast), or mineral deposits.

In the example of fluid conduits used in beer supply such considerations apply. Beer production techniques involve microbiological processes, including controlling the balance/interaction of yeast and lactic bacteria within the manufacturing process. Although most commercial beer production, especially lager production, includes steps to remove most yeast spores, some may remain in the beer. Also, “wild yeast” is present in the environment, and can enter the beer cellar/beer line delivery systems, for example through keg couplers, cleaning ring sockets, or water supplies. The natural build-up of biofilm within beer lines can catch microscopic elements including yeast spores which attach to it and to each other. This process can encourage bacterial growth. In old or pitted beer lines, it may be that calcium oxalate (commonly known as “beerstone”) can form through the reaction of alkaline materials (e.g. cleaning product residue), hard water minerals, and proteins such as amino acids. A similar deposition may occur in milk conveying machinery, for example. Beerstone causes beer to taste “off” and may cause it to spoil more quickly, by forming a surface on which microorganisms can thrive.

Microbial activity and/or deposition of calcium oxalate in beer lines contaminates the beer lines and the beer flowing through them, which can negatively affect the quality and taste of the beer, and may cause the product to be unfit for consumption. Beer lines may require cleaning regularly to reduce such contamination, for example every week. Similar contamination in other food and drink conduits also requires those lines and machinery to be regularly cleaned out. It may be that cleaning out the conduits involves emptying the conduit of fluid (thus wasting it if the fluid is a beverage, for example) and taking time to clean the conduit, during which time it cannot be used for its intended purpose.

SUMMARY OF THE INVENTION

The present invention may address the above problems by providing a way of both reducing the development and formation of microorganisms and/or calcium oxalate within a conduit, as well as providing an effective cleaning method to remove microorganisms and/or calcium oxalate present in the conduit. An electromagnetic device described herein may reduce the formation of the microorganisms and/or calcium oxalate, while the use of the cleaning product described herein, which may be used in combination with the electromagnetic device, may also reduce the formation of the microorganisms and/or calcium oxalate and remove any remaining contaminants in the conduits.

In an aspect there is provided a kit of parts for cleaning a fluid conduit, the kit of parts comprising:

- a device comprising: a coil configured to be positioned around the fluid conduit; and a controller in electrical connection with the coil, and
- a powder composition comprising sodium percarbonate, sodium metasilicate, sodium carbonate, and ethylenediaminetetraacetic acid (EDTA), the powder composition configured to form a disinfecting and water softening cleaning solution when dissolved in a liquid within the conduit;
- wherein the controller is configured to, in use, supply a varying electrical signal to the coil to generate a corresponding varying strength magnetic field within the fluid conduit having a solution of the powder composition therein for causing cleaning of the fluid conduit.

The electrical signal supplied by the controller to the coil may be a pulsed DC electrical signal rectified from AC. Preferably the AC signal from which the pulsed DC electrical signal is obtained is a sinusoidal signal.

The varying electrical signal may have a varying frequency of between 3 kHz and 20 kHz. Preferably the varying frequency is between 6 kHz and 10 kHz.

The varying strength magnetic field within the fluid conduit may have a varying magnetic field strength of between 0.2 μT and 80 μT. Preferably the varying magnetic field strength is between 0.5 μT and 50 μT. More preferably the varying magnetic field strength is between 0.5 μT and 20 μT.

The coil may be configured to be positioned around and in contact with an outer surface of the fluid conduit.

The coil may be configured to extend along a section of the fluid conduit of a length between 5 cm and 50 cm. Preferably the length is between 15 cm and 25 cm The coil may have between 50 and 80 turns. Preferably the coil has between 60 and 70 turns.

The coil may comprise a length of copper wire of cross sectional area between 0.6 $mm^2$ and 1.5 $mm^2$. Preferably the cross sectional area is approximately 1 $mm^2$.

The kit of parts may further comprise: a temperature sensor for locating proximal to the fluid conduit, and an alarm module connected to the temperature sensor and configured to receive a temperature indication from the temperature sensor; wherein the alarm module is configured to output an alarm signal when the temperature indication indicates the sensed temperature is above a predetermined temperature threshold.

The kit of parts may be for use in cleaning a fluid conduit configured to supply a beverage for consumption. Preferably the beverage is an alcoholic beverage. More preferably, the beverage is beer.

In a further aspect, there is provided a method of cleaning a fluid conduit, the method comprising: adding a disinfecting and water softening cleaning solution into the fluid conduit, the solution comprising sodium percarbonate, sodium metasilicate, sodium carbonate, and ethylenediaminetetraacetic acid (EDTA) dissolved in a liquid; positioning a coil around the fluid conduit, and supplying a varying electrical signal to the coil to generate a corresponding varying strength magnetic field within the fluid conduit, causing the fluid conduit to be cleaned.

Supplying the varying electrical signal may comprise supplying a pulsed DC electrical signal rectified from AC, preferably wherein the AC signal from which the pulsed DC electrical signal is obtained is a sinusoidal signal.

Supplying the varying electrical signal may comprise supplying an electrical signal having a varying frequency of between 3 kHz and 20 kHz, preferably a varying frequency of between 6 kHz and 10 kHz.

Supplying the varying electrical signal may generate a corresponding varying strength magnetic field within the fluid conduit of a varying magnetic field strength of between 0.2 μT and 80 μT; preferably wherein the varying magnetic field strength of between 0.5 μT and 50 μT; more preferably wherein the varying magnetic field strength of between 0.5 μT and 20 μT.

The method may comprise leaving the cleaning solution in the fluid conduit for a soaking period of between 2 and 24 hours; and flushing out the cleaning solution after the soaking period.

The method may comprise supplying the varying electrical signal to the coil to cause the varying strength magnetic field within the fluid conduit while the fluid conduit contains the cleaning solution.

The method may comprise: a first phase of supplying the varying electrical signal to the coil to cause the varying strength magnetic field within the fluid conduit while the fluid conduit contains a beverage to be supplied for consumption; removing the beverage from the fluid conduit then adding the cleaning solution to the conduit; and a second phase of supplying the varying electrical signal to the coil to cause the varying magnetic field within the fluid conduit while the fluid conduit contains the cleaning solution.

The first phase may occur over a period of between 5 and 50 days; preferably over a period of between 25 and 30 days. The second phase may occur over a period of between 2 and 24 hours; preferably over a period of between six and 12 hours.

The method may comprise removing the cleaning solution from the fluid conduit and flushing the fluid conduit with clean water prior to adding a beverage to be supplied for consumption into the fluid conduit.

The cleaning solution may be added into the fluid conduit at a temperature of between 50° C. and 80° C.; preferably at a temperature of approximately 65° C.

The method may further comprise: sensing a temperature proximal to the fluid conduit, and providing an alarm signal when the sensed temperature is above a predetermined temperature threshold.

The method may comprise an initial pre-cleaning procedure performed prior to a rolling-cleaning procedure, wherein the initial pre-cleaning procedure comprises:

supplying a varying electrical signal to the coil to cause the varying magnetic field within the fluid conduit, while the fluid conduit contains the cleaning solution, for a pre-cleaning period, on a plurality of pre-clean instances, each pre-clean instance separated by a pre-clean pause period; and the rolling cleaning procedure comprises:

supplying a varying electrical signal to the coil to cause the varying magnetic field within the fluid conduit, while the fluid conduit contains the cleaning solution, for a cleaning period, periodically at rolling-cleaning instances, each rolling-cleaning instance separated by a rolling-cleaning pause period;

wherein the pre-clean pause period is less than the rolling-cleaning cleaning period; preferably wherein the pre-clean pause period is between one quarter to one third of the rolling-cleaning pause period.

BRIEF DESCRIPTION OF THE DRAWINGS

One or more examples will now be described, by way of example only, with reference to the accompanying drawings, in which.

DETAILED DESCRIPTION

The present invention relates to treating a fluid conduit to assist in keeping the conduit dean. The conduit may be used to transport fluids such as human and/or animal consumable items, such as foodstuffs, beverages, or ingredients for foodstuffs and/or beverages, for example. Examples may be particularly suitable for conduits used for conveying beverages such as alcoholic drinks (e.g. beer or wine), soft drinks, milk, or other consumable fluids. In particular, examples may be well suited for fluid conduits used for conveying beer (e.g. beer lines used to convey lager, ales, stout, etc., for example from a beer keg/barrel to a beer pump or beer tap). In general, the fluid conduit may convey a fluid which it would be beneficial to be able to convey without contamination or fouling due to contaminants in the fluid conduit. Examples disclosed herein may reduce and/or remove microbiological and/or mineral contaminants which may develop within the conduit. Examples disclosed herein relate to a device and a solution which together may be used to clean, and maintain cleanliness of, a fluid conduit.

Figure 1:
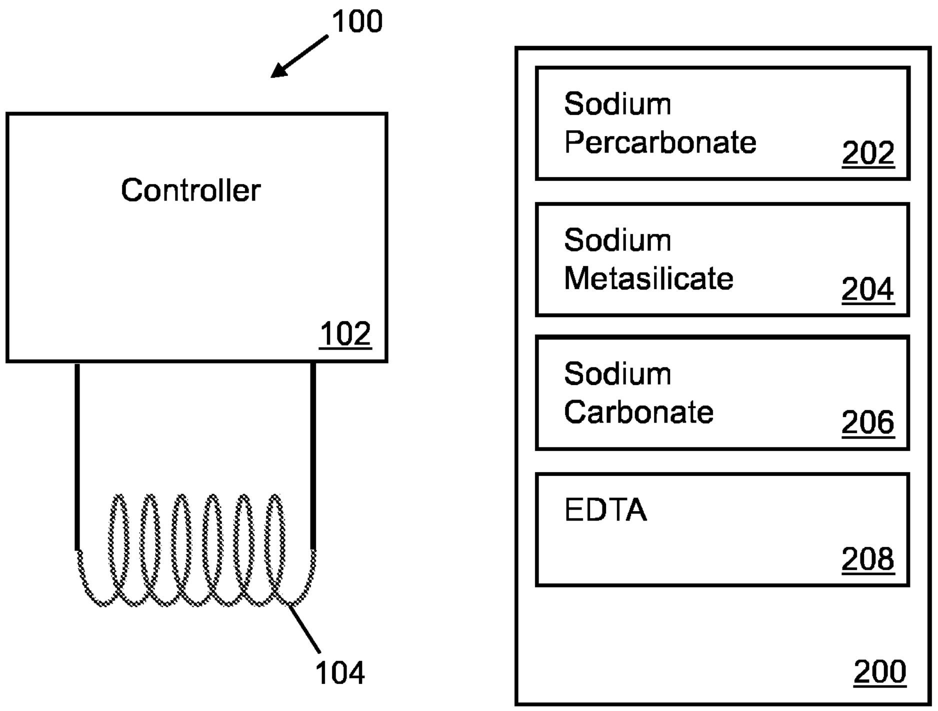
FIG. 1 shows an example of a kit of parts according to examples disclosed herein.

FIG. 1 shows an example of a kit of parts for cleaning a fluid conduit. The kit of parts comprises a device 100 and a powder composition 200.

The device 100 comprises a coil 104 which is configured to be positioned around a fluid conduit. The device 100 also comprises a controller 102 which is in electrical connection with the coil 104.

The powder composition 200 comprises a plurality of solid materials. These materials comprise sodium percarbonate 202, sodium metasilicate, 204, sodium carbonate 206, and ethylenediaminetetraacetic acid (EDTA) 208. The powder composition 200 is configured to form a disinfecting and water softening cleaning solution when dissolved in a liquid. The cleaning solution may be introduced into the conduit to be cleaned (i.e. the conduit around which the coil 104 is positioned).

In use, the controller 102 is configured to supply a varying electrical signal to the coil 104 to generate a corresponding varying strength magnetic field within the fluid conduit having a solution of the powder composition 200 therein, for causing cleaning of the fluid conduit.

Powder Composition 200

The powder composition 200 comprises a plurality of solid materials which may be present as powder, granules, or other small particles. The powder can be dissolved in water to form a disinfecting and water softening cleaning solution.

The powder composition 200 comprises sodium percarbonate 202, $Na_2H_3CO_8$, sometimes written as $2Na_2CO_2 \cdot 3H_2O_2$. It may be considered a type of non-chlorine bleach and is sometimes referred to as "oxygen bleach" or "SPC". It may be considered to be an eco-friendly bleach. Sodium percarbonate 202 may form the highest proportion of material in the powder composition 200 in some examples. If dissolved in water, sodium percarbonate 202 yields hydrogen peroxide, which decomposes into water and oxygen, sodium ions, and carbonate ions. Bleaches act as oxidants to break chemical bonds, for example of contaminants. Traditional chlorine bleaches may contain sodium hypochlorite as the oxidiser, which is highly toxic. Hydrogen peroxide released by sodium percarbonate 202 plays the role of a bleach agent in the powder compositions 200 disclosed herein. Hydrogen peroxide acts as an effective antiseptic and disinfectant, and may be considered a safe and environmentally friendly alternative to traditional chlorine bleaches.

The powder composition 200 comprises sodium metasilicate, 204, $Na_2SiO_3$, which is an ionic water soluble compound. Sodium metasilicate 204 forms a very strong base and buffers the pH of a solution of the powder composition 200 at around pH13 when the powder composition 200 is mixed with water. The alkaline pH of the cleaning solution acts to enhance the cleaning power of sodium percarbonate in the solution. Sodium metasilicate 204 in the powder composition 200, when dissolved in water, acts as a builder which enhances cleaning efficiency and aids in decreasing water hardness. It also acts as a chemical degreaser, reacting with fatty acids to form a soap, which can then be rinsed away.

The powder composition 200 comprises sodium carbonate 206, $Na_2CO_3$. Sodium carbonate 206 may help prevent hard water from bonding with detergent in the cleaning solution. This can allow for a more even distribution of the cleaning solution during the clean of the fluid conduit. Sodium carbonate 206 is a very effective agent in removing alcohol and grease stains from surfaces.

The powder composition 200 comprises ethylenediaminetetraacetic acid (EDTA) 208, $[CH_2N(CH_2CO_2H)_2]_2$. It may be present in a small quantity compared with other compounds in the composition, e.g. between around 1% to around 3%, for example, 2%, 2% is small enough that the cleaning powder may be considered to be within environmental safety standards (i.e. the cleaning powder may be termed "Eco-Friendly" with respect to the level of EDTA present). In other examples the level of EDTA may be less than 2%, or less than 1%, for example. EDTA may be present in the powder composition 200 as a salt such as disodium EDTA, sodium calcium EDTA or tetrasodium EDTA, for example. EDTA 208 acts to assist with the cleaning power of the cleaning solution in hard water areas. EDTA is used to dissolve limescale, and acts as a chelating agent as it can sequester metal ions such as $Ca^{2+}$ and $Mg^{2+}$ which are common cations found in hard water.

The powder composition 200 provides a food-safe and low/no odour chemical cleaner which is safer for the environment (e.g. if released into the sewage system/waterways) than some traditional cleaners including chlorine-based bleaching chemicals such as sodium hypochlorite (NaClO) which liberate chlorine as an active cleaning component. The powder composition 200 is therefore well suited for cleaning fluid conduits used for conveying food and drink, such as beer lines. The powder composition 200 does not liberate chlorine as an active cleaner, which is beneficial, because chlorine-based cleaners which liberate chlorine can cause corrosion of some materials and surfaces (including fabrics, metals and plastics), can cause burns to the skin and eyes, and act as a biocide which harms wildlife if released into the environment.

The powder composition 200 does not contain phosphorous or nitrogen based compounds which is also preferable as an ecologically friendly solution. Phosphorous-based cleaning compounds (which may be called "phosphates") may be used in some detergents to soften hard water, but they can remain in wastewater and undesirably cause nutrient pollution and provide food for algae.

When mixed with water, the powder composition 200 disclosed herein may break down to form hydrogen peroxide and sodium carbonate, which may be considered less harmful than chlorine bleach reaction products, for example.

Device 100

The device 100 comprises a controller 102 and a coil 104. In use, the controller 102 is configured to supply a varying electrical signal to the coil 104 to generate a corresponding varying strength magnetic field within the fluid conduit having a solution of the powder composition 200 therein, for causing cleaning of the fluid conduit.

The electrical signal supplied by the controller 102 to the coil 104 may be a pulsed DC electrical signal rectified from AC. The AC signal from which the pulsed DC electrical signal is obtained may be a sinusoidal signal, for example. The electrical signal may be considered to be a varying intensity, pulsed electromagnetic signal. The pulsed signal in turn generates a varying magnetic field within the coil 104.

The controller 102 may comprise a main printed circuit board (PCB) and solid state electronics (e.g. analogue microprocessors) to generate a continuous analogue sine wave and rectify this to provide a pulsed DC waveform. The varying electrical signal may have a frequency within the Very Low Frequency, VLF, range of between 3 kHz and 30 kHz. The frequency of the generated waveform may vary between 3 kHz and 20 kHz, for example, between 6 kHz and 10 kHz. In other examples the frequency of the generated waveform may at least partly be outside the 3 kHz and 30 kHz range.

The varying strength magnetic field within the fluid conduit may have a varying magnetic field strength of between 0.2 μT and 80 μT. Preferably the varying magnetic field strength may be between 0.5 μT and 50 μT. More preferably the varying magnetic field strength may be between 0.5 μT and 20 μT. The magnetic field strength generated within the coil may vary between, for example, 0.005 Gauss-0.15 Gauss (that is, 0.05 μT to 15 μT). In other examples the varying magnetic field strength may at least partly be outside the 0.2 μT and 80 μT range. The magnetic field may be considered to be moving as a varying strength magnetic field is generated within the fluid conduit due to the varying electrical signal supplied to the coil.

The coil 104 output voltage may be between 12V DC-13V DC in some examples. Circuitry in the controller 102 may, for example, contain 24V DC and 12V DC feeds to analogue components which are configured to provide the output voltage of, for example, between 12.40V DC-12.62V DC. In other examples the output voltage may at least partly be outside the 12V DC to 13V DC range The varying magnetic field acts to reduce the formation of biofilms and contaminants on the inside of the fluid conduit by disturbing the contaminant molecules. For example, the varying magnetic field may cause protein molecules to move (e.g. spin) and reduce the ability of the proteins to adhere to the inner surface of the conduit, and/or to each other. For example, the varying magnetic field may cause microbiological contaminants (e.g. yeast, bacteria) to exhibit a biological response by causing ions in those contaminants to be affected by the magnetic field through ion parametric resonance, and thus the contaminants are prevented from developing (e.g. multiplying) in the fluid conduit.

Yeast is one of the most intensively studied eukaryotic model organisms. Studies have investigated the effects of both static and moving electromagnetic fields on yeast growth/distribution and biofilm production in aqueous solutions. When exposed to a moving magnetic field in the lower 0.5 μT-20 μT range and varying frequencies towards the lower end of the Very Low Frequency (VLF) range of between 3 kHz and 30 kHz, both yeast growth and biofilm production may be suppressed through disruption of the molecular charged particles exposed to the changing magnetic field. However, above magnetic field strengths of around 90 μT, biofilms may be able to form again. Thus lower μT strength magnetic fields may be more effective in suppressing biofilm growth.

Beerstones (calcium oxalate) may be challenging to clean off/remove from beer lines, as they are formed from a combination of calcium-containing mineral scale (like hard water scale) and binding proteins. Cleaning solutions discussed herein act to soften the water, which aids the cleaning activity of alkaline cleaners without requiring strongly caustic solutions to be used. As described above, the varying magnetic field reduces the build-up of beerstone and other bio-film material, and the cleaning powder solution acts to remove any beerstone that has built up, through the chemical effects of water softening/cleaning, especially in hard water areas.

Figure 2:
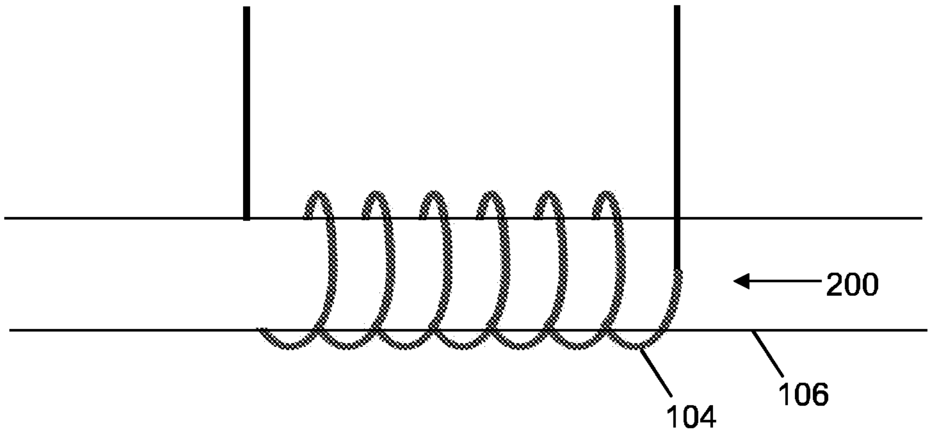
FIG. 2 shows an example of a coil located around a fluid conduit according to examples disclosed herein.

FIG. 2 shows an example of a coil 104 located around a fluid conduit 106. The cleaning solution 200 may be present in the fluid conduit 106, either at rest in the fluid conduit 106 (i.e. left to soak), or being caused to flow along the fluid conduit 106 (i.e. to flush out the fluid conduit 106 and any contaminants washed into the cleaning solution 200). The schematic figure shows the coil 104 is wound around the fluid conduit 106, in proximity to but not touching the conduit 106. In some examples, the coil may be configured to be positioned around and in contact with an outer surface of the fluid conduit 106. The coil 104 may be coated in a protective cover in some examples, such as a plastic coating.

The coil 104 in some examples may be configured to be slid over a free end of the fluid conduit 106. For example, a beer line may be disconnected from a keg, leaving a fluid conduit 106 free end, the coil may be slid over the free end, and the line may be reattached (e.g. back to the keg, or to a reservoir of cleaning solution). The coil 104 in some examples may be wound round the fluid conduit 106 and remain in place while the fluid conduit 106 is used for conveying fluid for its intended purpose (e.g. supplying a beverage for consumption). This may be considered to be a “hard wired” installation of the coil 104. In some examples, the coil may be arranged in a “quick fit” clamp configuration so that it may be readily affixed around a fluid conduit by being clamped around the conduit, and readily removed from the fluid conduit by unclamping it, without requiring an end of the conduit to be free. In some examples, the device 100 may remain installed on the fluid conduit, and remain in operation providing a varying magnetic field, during use of the fluid conduit for its intended purpose (e.g. supplying beer) and help to maintain a clean conduit.

Figure 3:
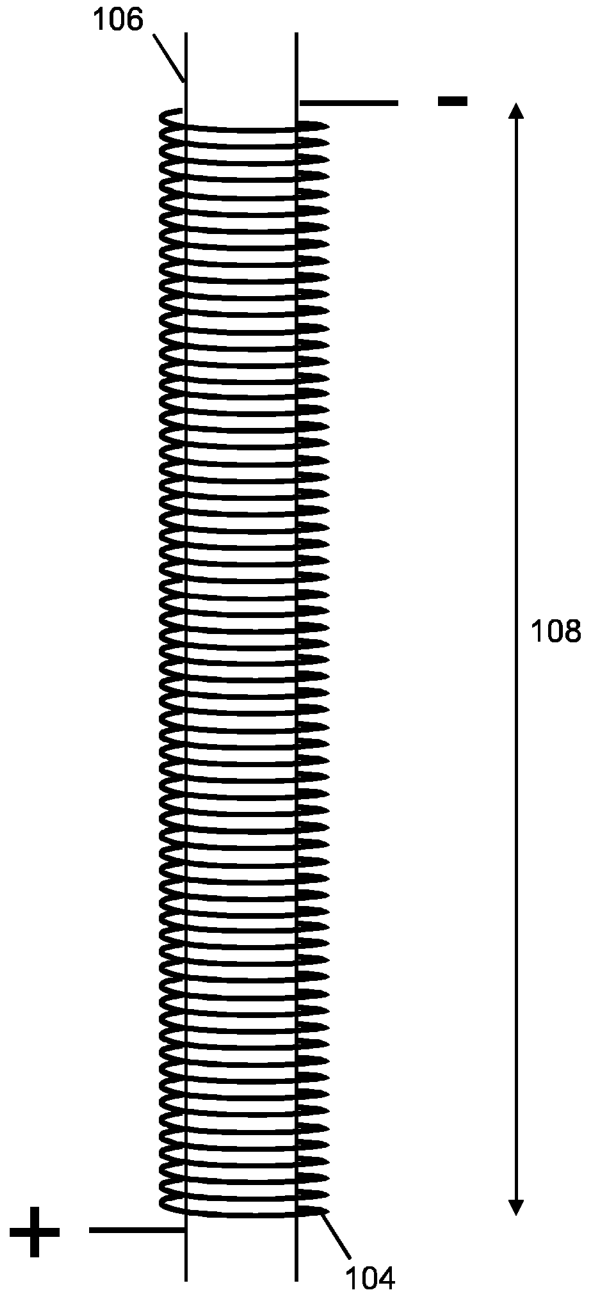
FIG. 3 shows an example of a coil indicating example dimensions according to examples disclosed herein.

FIG. 3 shows an example of a coil indicating possible dimensions of a real world example. The illustrated coil 104 has 66 turns around a 10 mm diameter fluid conduit 106. The coil 104 in this example is formed from a single 28 cm length of 1 $mm^2$ Tri-Rated flexible copper cable, wound to form a coil of a length 108 which is around 20 cm. In some examples, the coil may comprise a length of conductive wire of cross sectional area between 0.6 $mm^2$ and 1.5 $mm^2$, for example, of a cross sectional area of approximately 1 $mm^2$. In other examples, a different cross sectional area coil wire may be used. In other examples the coil may not necessarily be substantially copper, but another conductive material.

More generally, the coil may have between 50 and 80 turns, for example, between 60 and 70 turns. In other examples the coil may have more than 80, or fewer than 50 turns. More generally, the coil 106 may be configured to extend along a section of the fluid conduit 106 of a length 108 of between 5 cm and 50 cm, for example, a length 108 of between 15 cm and 25 cm. In other examples the coil may be shorter than 5 cm, or longer than 50 cm, along the conduit. While the length 108 of the coil 104 may be much shorter than the length of the fluid conduit 106, the varying magnetic field may induce an effect along substantially the whole length of the fluid conduit 106, effecting a cleaning effect throughout substantially the full length of the conduit 106. Thus the effect of the varying magnetic field is still present downstream/upstream of the coil placement on the fluid conduit 106.

A combination of VLF frequency electrical signals generating a moving magnetic field as disclosed above has been observed to suppress both yeast and biofilm build-up in aqueous solutions. The VLF analogue electromagnetic waves also have the added benefit of being able to travel up to 10 km through aqueous solutions, and therefore can generate effective varying strength magnetic fields along the fluid conduit 106 (e.g. along the whole beer line from keg to tap). Thus, example devices 100 such as those disclosed herein can provide effective cleaning of fluid conduits, such as beer lines, regardless of length, and the fluid conduit 106 may remain clean for longer than if no such device was present (for example, up to a month) without requiring a one-off deep clean. The taste, flavour and freshness of beverages or foodstuffs conveyed along the fluid conduits may thus be maintained to a high quality standard, sufficient for commercial beverage providers including commercial brewery producers.

Figure 4A:
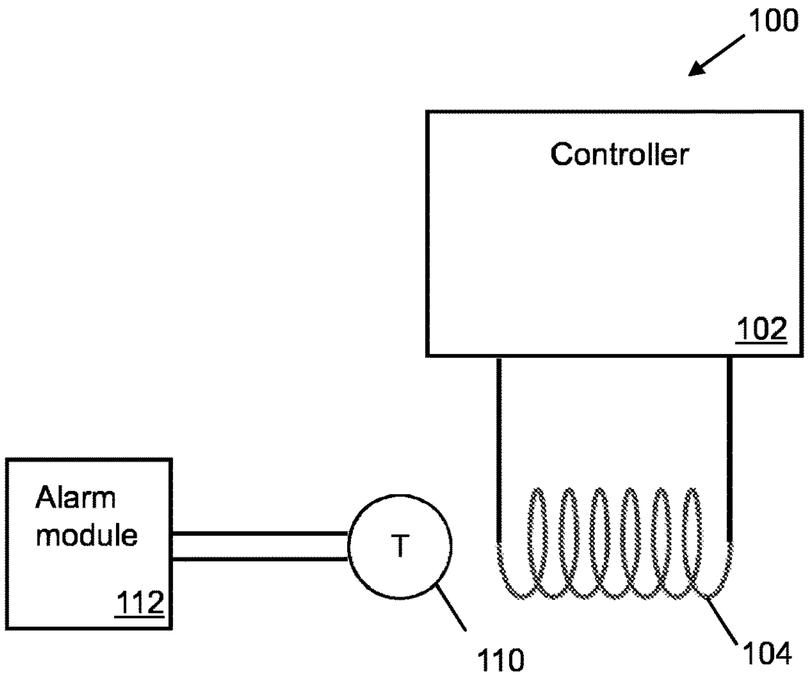
FIGS. 4*a* and 4*b* show examples of a kit of parts comprising a temperature sensor according to examples disclosed herein.
Figure 4B:
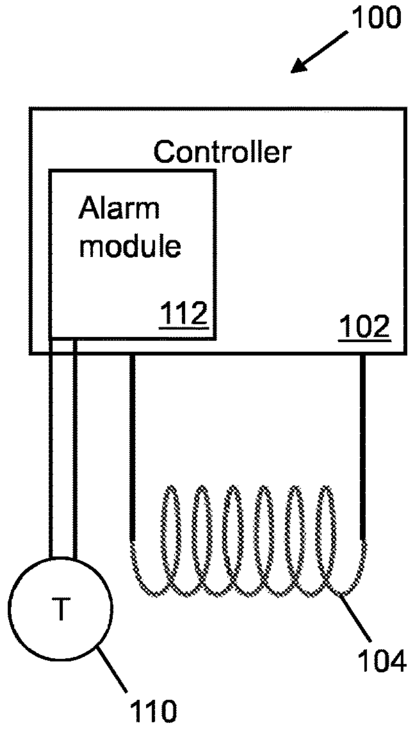

FIGS. 4*a* and 4*b* show examples of a controller 200, a temperature sensor 110, and an alarm module 112. The temperature at which a liquid is stored may affect the properties of the liquid. For example, if a foodstuff is stored at too high or too low a temperature, the quality (e.g. taste, safety for consumption) of that foodstuff may be reduced. As an example, if a cellar temperature is too high, then beverages stored in the cellar (e.g. beer, wine) may be negatively affected because the higher temperature provides a more favourable environment for contaminants to develop, such as bacteria or yeast deposits. Such contaminants may develop in the storage containers (e.g. kegs) as well as in the fluid conduits through which the fluid is provided from the cellar to the dispenser (e.g. beer pump or tap) for serving. Thus it is desirable to be able to monitor the temperature where the fluid conduit 106, and/or the fluid container, are stored.

In some examples, the temperature sensor 110 (e.g. thermometer) may be separate from the coil 104 and controller 102 as in FIG. 4*a*. In some examples, the temperature sensor 110 (e.g. thermometer) may be an integrated part of the controller 102 as in FIG. 4*b*. The temperature sensor 110 in either case may be configured to be located proximal to the fluid conduit 106. The alarm module 112 is connected to the temperature sensor 110 and is configured to receive a temperature indication from the temperature sensor 112. The alarm module 112 may be configured to output an alarm signal when the temperature indication indicates the sensed temperature is above (and/or in some examples, below) a predetermined temperature threshold. For example, if the fluid conduit 106 is to supply beer from a keg, then the beer keg and beer line may preferably be kept at a temperature below 12° C. (and in some examples above a lower threshold, such as about 0° C.). For example, draught beer may beneficially be stored at temperatures below 12° C., as at temperatures above this threshold, it is easier for yeast and other biocontaminants to grow which spoil the beer. The alarm module 112 in this example would be configured to output an alarm signal when the temperature indication indicates the sensed temperature is above the temperature threshold (e.g. 12° C.) (and/or possibly output an alarm signal when the temperature indication indicates the sensed temperature is below a lower temperature threshold, such as 0° C.). A temperature above 12° C. may be high enough to encourage bacteria and yeast to multiply in the beer lines, whereas below 12° C. such bacteria and yeast may not be able to develop so readily (although below 0° C. may be too cold for the beer to retain a fresh flavour). The alarm module and temperature sensor may be very sensitive (for example, to an accuracy of 0.1° C.), to help ensure that the venue's cellar staff are aware as soon as possible of any increase in cellar temperature, that may otherwise be missed if relying on old/unserviced air conditioning equipment, and/or badly placed or inaccurate thermometers for temperature monitoring.

In the example of FIG. 4*a*, the alarm module may be in wired or wireless communication with the controller 102, and/or with an external device (not shown), such as a portable device like a smartphone. The portable device may be the device of a person tasked with maintaining quality of the storage environment in which the temperature is being monitored. In the example of FIG. 4*b*, the alarm module is an integral part of the controller 102 and the controller may output an alarm either from the controller, or communicate an alert to an external device (not shown) such as a portable device. The controller may then sound an alarm or show a visual alert. In examples where the indication of high temperature is sent to an external portable device (or other device receiving the alarm signal), the receiving device may output a notification to alert someone that the temperature is too high and steps should be taken to reduce the temperature to maintain quality of the stored fluids/foodstuffs.

Figure 5A:
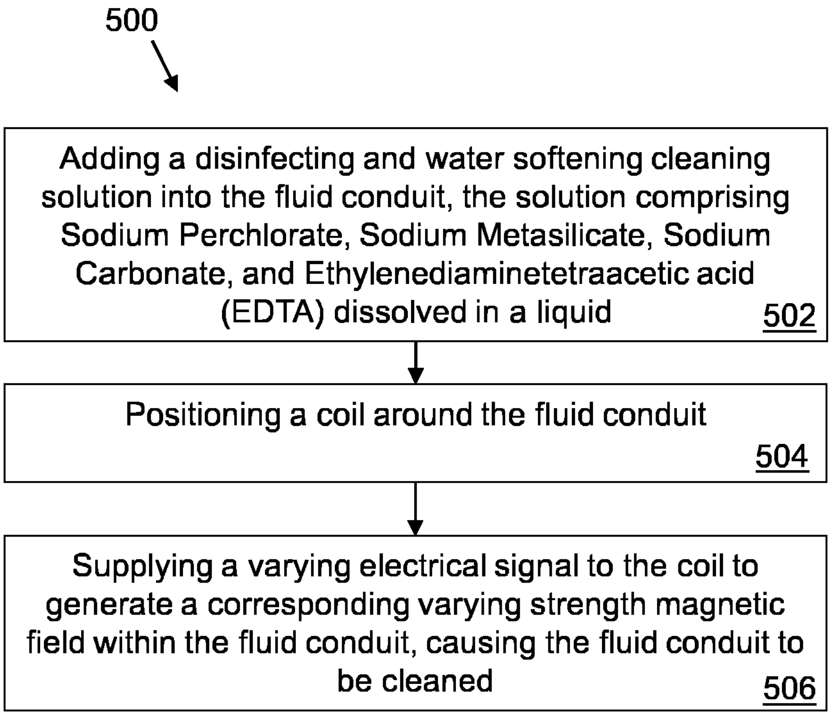
FIGS. 5*a* to 5*c* illustrate methods according to examples disclosed herein.
Figure 5B:
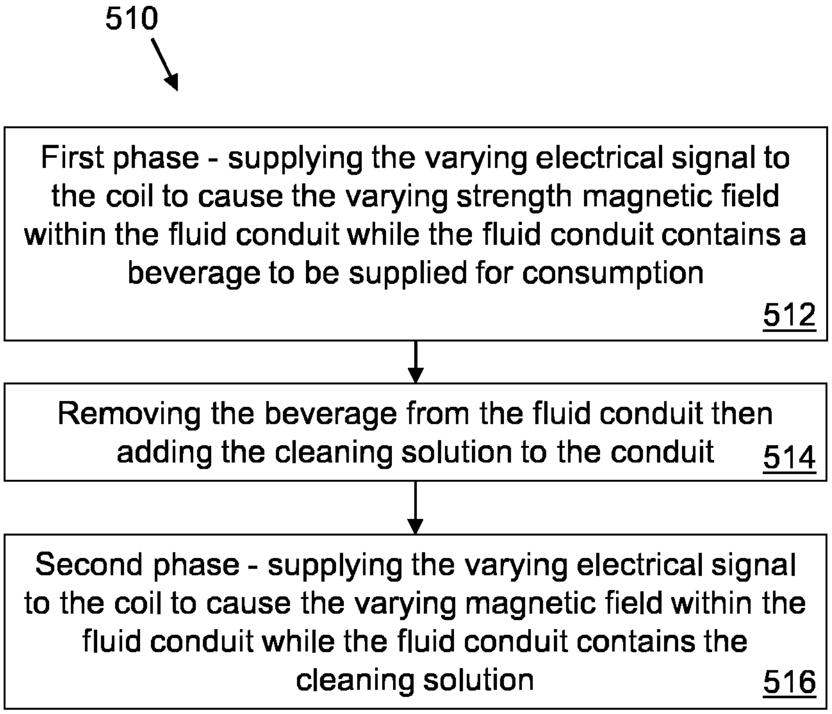
Figure 5C:
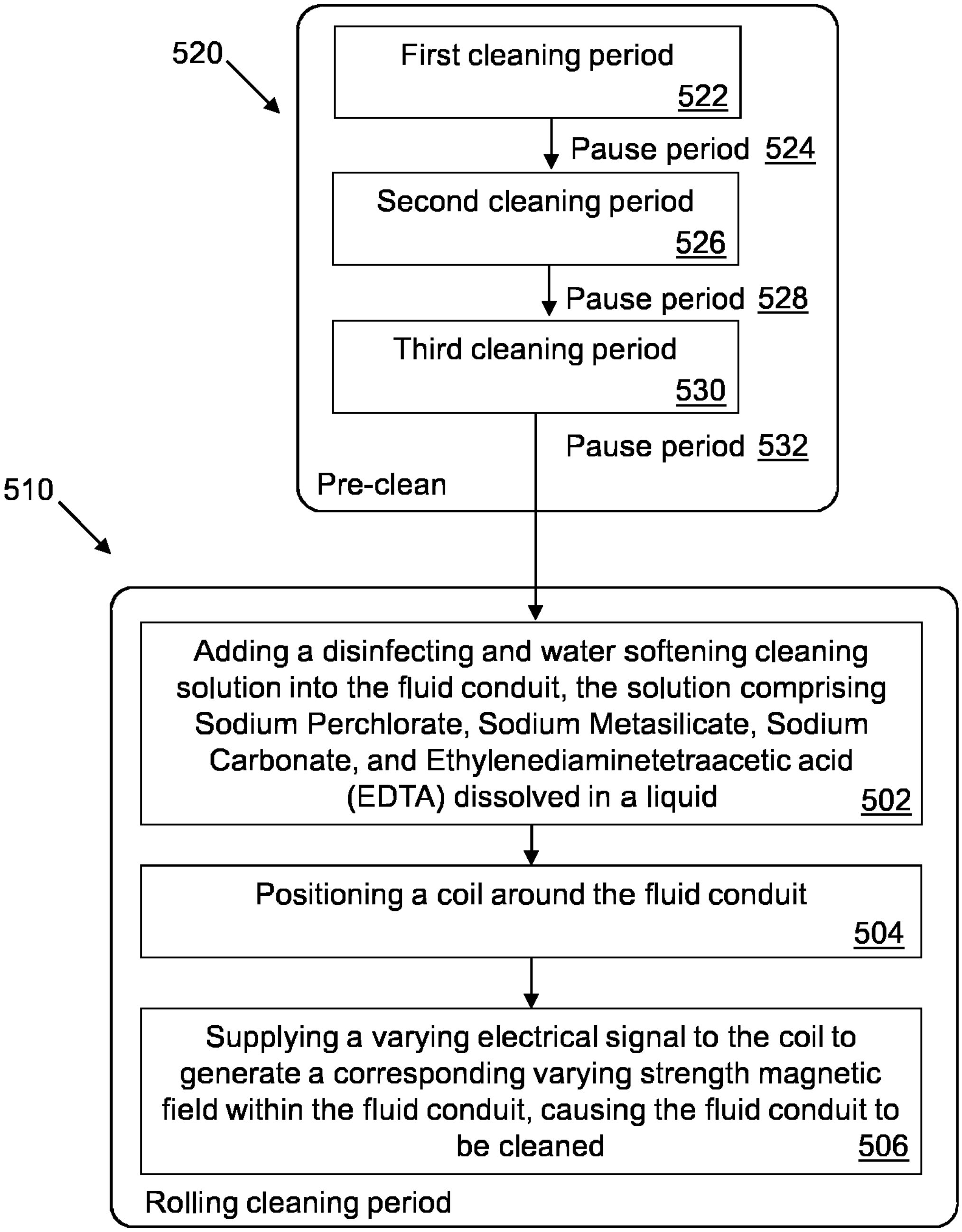

FIGS. 5*a* to 5*c* illustrate methods 500, 510, 520 of cleaning a fluid conduit. In Figure Sa, the method 500 comprises a step 502 of adding a disinfecting and water softening cleaning solution into the fluid conduit, the solution comprising sodium percarbonate, sodium metasilicate, sodium carbonate, and ethylenediaminetetraacetic acid (EDTA) dissolved in a liquid; a step 504 of positioning a coil around the fluid conduit, and a step 506 of supplying a varying electrical signal to the coil to generate a corresponding varying strength magnetic field within the fluid conduit, causing the fluid conduit to be cleaned.

As described above, supplying the varying electrical signal 506 may comprise supplying a pulsed DC electrical signal rectified from AC, preferably wherein the AC signal from which the pulsed DC electrical signal is obtained is a sinusoidal signal Supplying the varying electrical signal 506 may comprise supplying an electrical signal having a varying frequency of between 3 kHz and 20 kHz; preferably a varying frequency of between 6 kHz and 10 kHz. Supplying the varying electrical signal 506 may generate a corresponding varying strength magnetic field within the fluid conduit of a varying magnetic field strength of between 0.2 μT and 80 μT; preferably a varying magnetic field strength of between 0.5 μT and 50 μT; more preferably a varying magnetic field strength of between 0.5 μT and 20 μT.

In some examples, the cleaning solution may be left in the fluid conduit for a soaking period of between 2 and 24 hours, and the cleaning solution may be flushed out of the fluid conduit (for example, with clean water) after the soaking period. Such a soaking period may allow for contaminants inside the fluid conduit to be broken down or softened by the cleaning solution, allowing for them to be more easily rinsed away after soaking.

FIG. 5*b* shows an example phased process 510 for cleaning the fluid conduit. In this example method 510 there is a first phase 512 in which the varying electrical signal is supplied to the coil, to cause the varying strength magnetic field within the fluid conduit, while the fluid conduit contains a beverage to be supplied for consumption. In a next step 514, the beverage may then be removed from the fluid conduit, then the cleaning solution may be added to the conduit. In a second phase 516, the varying electrical signal may be supplied to the coil to cause the varying magnetic field within the fluid conduit while the fluid conduit contains the cleaning solution. The first phase may, for example, occur over a period of between 5 and 50 days; preferably over a period of between 25 and 30 days (e.g. 28 days). The second phase may, for example, occur over a period of between 2 and 24 hours; preferably over a period of between six and 12 hours, for example, 8 hours.

The method of FIG. 5*b* may take place over, for example, a 28 day period, or over a month and repeat in a monthly cycle, for example. In the first phase 512, the build-up of contaminants (e.g. yeast/biofilm/bacteria and calcium oxalate) within the fluid conduit are suppressed by the varying strength magnetic field, to a low level (i.e. below an acceptable threshold). For example, in a beer supply arrangement, the levels of contaminants in the beer lines may be kept sufficiently low that optimum beer quality is maintained (e.g. freshness, taste, levels of contaminants below predetermined thresholds for safety/quality). This maintenance of low levels of contaminants may take place for an extended period, such as 28 days for example. The first phase may be called a controlled phase, because the device may continuously run while the fluid conduit is in normal operation (e.g. supplying beer). During the first phase, if for example the fluid conduits are still being used to supply fluids for use, for example a beer line supplying beer, then the method may also comprise sensing a temperature proximal to the fluid conduit, and providing an alarm signal when the sensed temperature is above a predetermined temperature threshold. As described above, elevated temperatures in the fluid conduit (e.g. beer line) may facilitate the development of contaminants such as yeasts and biofilms, and thus maintaining a low operating temperature to mitigate against contaminant development may be desired.

At the end of the first phase 512/controlled period (e.g. the end of the 28 day cycle), and to help ensure that contaminants (e.g. yeast/biofilm/bacteria) do not exceed a level where they are above an acceptable threshold (e.g. low enough to avoid negatively affecting the taste and quality of beverage supplied by the conduit), the second phase 516 may be performed. An amount of contaminants that may have built-up over the first period may be removed (or eliminated) in this second phase, using both the device 100 and solution 200, before commencing the first phase 512 again.

Between the first and second phases 512, 516, any product in the conduit may be removed and the cleaning solution added to the conduit 514. In the second phase a cleaning solution made by dissolving the cleaning powder 200 in water is introduced into the fluid conduit (and as above, may be left to soak). The water solute may be hot water, for example, between 50° C.-80° C.; may be warm water, for example between 30° C.-50° C.; or may be at ambient temperature, in some examples. In some examples, the solution may be left to soak while the device 100 is switched off. However, in other examples, the device 100 may be left to operate while the cleaning solution is in the conduit.

It may be advantageous for the second phase to include both the cleaning solution being present in the fluid conduit at the same time as the device 100 is operating and generating a varying strength magnetic field within the fluid conduit. In such examples, a synergistic effect may arise due to both the presence of a conductive solution in the fluid conduit and the varying magnetic field generated within the fluid conduit. Dissolution of the powder composition in water forms a cleaning solution which contains ions, and may thus be termed an electrolytic solution which can conduct electricity. The varying strength magnetic field generated by operation of the device 100 generates eddy currents in the electrolytic cleaning solution, which flow more easily through the fluid conduit than if the fluid within the conduit was less conductive (or if the fluid conduit was empty of fluid/contained air). Increased conductivity of the cleaning solution acts to increase the speed at which the cleaning solution removes contaminants from the fluid conduit through chemical reactions to break down and remove the contaminants (such as beerstone), and to increase the rate of dissociation of molecular contaminants in the fluid conduit (such as those related to biofilms). The more electrically conductive the aqueous solution is, then the more efficiently the cleaning process works, through increased molecular dissociation. The molecular dissociation is brought about by the presence of the varying magnetic field enhancing the chemical reactions in the aqueous solution and causing the contaminant molecules and other matter to break down and prevent them developing.

Increased temperature may also increase electrical conductivity of the electrolytic cleaning fluid within the fluid conduits, so in some examples the cleaning solution may be introduced into the conduit at a higher temperature than ambient temperature. Thus in some examples, the cleaning solution may be added into the fluid conduit at a temperature of between 50° C. and 80° C.; preferably at a temperature of approximately 65° C.

Following the method of FIG. 5*b*, the cleaning solution may be removed from the fluid conduit and the fluid conduit flushed out, for example using clean water, prior to adding a beverage to be supplied for consumption into the fluid conduit.

FIG. 5*c* shows an example pre-clean phase 520 for pre-cleaning the fluid conduit in what may be thought of as a more intensive cleaning process, which may be performed prior to a more long-term maintenance cleaning procedure as set out in FIG. 5*b*, for example.

FIG. 5*c* shows an example in which a pre-clean phase 520 for cleaning the fluid conduit is performed prior to a rolling-cleaning procedure as set out in FIG. 5*b*. In this example pre-cleaning method 520, there is a staged procedure for thoroughly cleaning the fluid conduits, in which a varying electrical signal is supplied to the coil to cause the varying magnetic field within the fluid conduit, while the fluid conduit contains the cleaning solution, for a cleaning period between 2 and 24 hours (e.g. 12 hours). This takes place a plurality of times 522, 526, 530, with successive cleaning periods separated by a pre-dean pause period 524, 528, 532. The pause period may be shorter (e.g. seven days) than the length of the first phase of FIG. 5*b* (e.g. 28 days). That is, in the pre-clean procedure 520, a plurality of times (e.g. three), a varying electrical signal is supplied to the coil to cause the varying magnetic field within the fluid conduit, while the fluid conduit contains the cleaning solution, for a cleaning period, wherein each cleaning period is separated by a pause period, and wherein the pause period is less than the duration of the first phase, all prior to a cleaning cycle of the first and second phases discussed above. For example, the cleaning period may be between 10-25% of the pause period, and the pause period may be between 10-25% of the duration of the first phase.

This is illustrated in FIG. 5*c*, wherein in step 522 a first cleaning period takes place by supplying the varying electrical signal to the coil to cause the varying magnetic field within the fluid conduit while the fluid conduit contains the cleaning solution for a cleaning period (e.g. between 2 and 24 hours). After a pause period 524 (of e.g. a week), this is repeated in a second cleaning period 526, and there may be plural pause periods 524, 528, 532 followed by cleaning periods 526, 530. For example, a cleaning period 522, 526, 530 may take place on days 1, 8 and 15 of a three-week pre-cleaning period (i.e. one week apart). The device may be operating during the pause periods 524, 528, 532 in some examples without the cleaning solution being present in the fluid conduit (the conduit may be empty, or clean water may be present in the conduit, for example). After, for example, a predetermined number of cleaning periods (e.g. three), or for example, after a determination that the fluid conduit contains levels of contamination below an acceptable predetermined threshold (e.g. yeast counts below an acceptable threshold), the rolling-cleaning program 510 of FIG. 5*b* may take place.

Generally, there may be an initial pre-cleaning procedure 520 performed prior to a rolling-cleaning procedure 510. The initial pre-cleaning procedure 520 may comprise supplying a varying electrical signal to the coil to cause the varying magnetic field within the fluid conduit, while the fluid conduit contains the cleaning solution, for a pre-cleaning period 522, 526, 530, on a plurality of pre-clean instances, each pre-clean instance separated by a pre-clean pause period 524, 528, 532. The rolling cleaning procedure 510 may comprise supplying a varying electrical signal to the coil to cause the varying magnetic field within the fluid conduit, while the fluid conduit contains the cleaning solution, for a cleaning period, periodically at rolling-cleaning instances, each rolling-cleaning instance separated by a rolling-cleaning pause period. The pre-clean pause period 524, 528, 532 is less than the rolling-cleaning cleaning period, and preferably the pre-clean pause period 524, 528, 532 may be between one quarter to one third (e.g. 7 days) of the rolling-cleaning pause period (e.g. 28 days).

While the pre-cleaning procedure 520 is illustrated as taking place prior to rolling cleaning 510, in some examples, it may also take place periodically after rolling cleaning too. For example, in the example of a beer cellar, if the premises are closed to the public for a period of time and drinks are not being served, then this pre-clean procedure 520 may be performed prior to re-opening the premises to help maintain a clean beer line.

Improved results may be obtained by a long-term or rolling cleaning procedure, if an initial deep clean, or "pre-clean" process 520 is first performed so that the rolling cleaning procedure 510 starts with the fluid conduit in a pre-cleaned or deep-cleaned state. Such a pre-clean 520 may, for example, help to remove stubborn or significant contaminants such as large beerstones, or thick biofilms, prior to the rolling cleaning treatment 510. For example, in the example of beer line cleaning, although there are industry standards and established procedures for beer line cleaning, in practice those procedures may not always be followed. They may be poorly communicated to the line cleaning operatives, for example, and so a sufficient cleaning protocol may not be followed. Further, if the beer lines have been previously cleaned in a way which can cause damage to the fluid conduit then those lines may be more susceptible to the development of contaminants (a pitted surface provides a higher surface area on which biocontaminants can adhere and multiply, and provide nucleation sites at which biocontaminants and mineral deposits such as beerstones can begin development, more readily than on a smooth unpitted surface). Such damage may have occurred, for example, through use of a caustic cleaning solution on a regular (e.g. weekly) basis, which can eat away/erode plastic beer lines over time. Consequently, beer line cleanliness/conditions in different venues can vary, and examples of cleaning procedures disclosed above may be performed to achieve a high level of cleanliness in the fluid conduits regardless of prior condition or cleanliness.

It will be appreciated that various changes and modifications can be made to the examples disclosed herein without departing from the scope of the appended claims.

The invention claimed is:

1. A long-term maintenance cleaning procedure for a fluid conduit comprising the steps of:

(a) positioning a coil around the fluid conduit and supplying a varying electrical signal to the coil to cause a varying strength magnetic field within the fluid conduit;

(b) carrying out a pre-clean procedure including pre-clean steps of:

(i) adding a cleaning solution to the fluid conduit for a cleaning period, the cleaning solution comprising sodium percarbonate, sodium metasilicate, sodium carbonate, and ethylenediaminetetraacetic acid (EDTA) dissolved in a liquid, and supplying the varying electrical signal to the coil to cause a varying strength magnetic field within the fluid conduit while the fluid conduit contains the cleaning solution for a cleaning period between 2 and 24 hours;

(ii) removing the cleaning solution from the fluid conduit;

(iii) pausing for a pause period after removing the cleaning solution from the fluid; and (iv) repeating pre-clean steps (i), (ii) and (iii) a plurality of times, with respective pre-clean (i) steps being separated by respective pre-clean steps (ii) and pre-clean step (iii);

(c) subsequent to the pre-clean procedure of step (b), carrying out a rolling-cleaning procedure including rolling-cleaning steps of:

(v) relying on a varying strength magnetic field to suppress the build up of contaminants in the fluid conduit while the fluid conduit contains a beverage for consumption for a first controlled phase;

(vi) removing an amount of contaminants built up over the controlled phase by adding a cleaning solution to the fluid conduit for a second phase, the cleaning solution comprising sodium percarbonate, sodium metasilicate, sodium carbonate, and ethylenediaminetetraacetic acid (EDTA) dissolved in a liquid; and (vii) repeating rolling-cleaning steps (iv) and (vi).

2. A long-term maintenance cleaning procedure according to claim 1, wherein the pause period of the pre-clean procedure is less than a length of the first controlled phase of the rolling-cleaning procedure.

3. Long-term maintenance cleaning procedure according to claim 1, wherein the pause period of the pre-clean procedure is between one quarter and one third of a length of the first controlled phase of the rolling-cleaning procedure.

4. A long-term maintenance cleaning procedure according to claim 1, wherein the pause period of the pre-clean procedure is between 10% and 25% of a length of the first controlled phase of the rolling-cleaning procedure.

5. A long-term maintenance cleaning procedure according to claim 1, wherein the first controlled phase of the rolling-cleaning procedure lasts for between 5 and 50 days.

6. A long-term maintenance cleaning procedure according to claim 1, wherein the pause period of the pre-clean procedure is 7 days.

7. A long-term maintenance cleaning procedure according to claim 1, wherein the cleaning period of the pre-clean procedure is between 10% and 25% of a length of the pause period of the pre-clean procedure.

8. A long-term maintenance cleaning procedure according to claim 1, wherein the cleaning period of the pre-clean procedure is between 2 and 24 hours.

9. A long-term maintenance cleaning procedure according to claim 1, wherein the pre-clean procedure includes three cleaning periods.

10. A long-term maintenance cleaning procedure according to claim 1, wherein the pre-clean procedure includes adding a first portion of the cleaning solution to the fluid conduit for a first cleaning period on day 1 of a three-week pre-cleaning period, removing the cleaning solution for a first pause period, adding a second portion of the cleaning solution to the fluid conduit for a second cleaning period on day 8 of the three-week pre-cleaning period, removing the cleaning solution for a second pause period, and adding a third portion of the cleaning solution to the fluid conduit for a third cleaning period on day 15 of the three-week pre-cleaning period.

11. A long-term maintenance cleaning procedure according to claim 1, wherein the second phase of the rolling-cleaning procedure lasts for between 6 and 12 hours.

12. A long-term maintenance cleaning procedure according to claim 1, wherein the first controlled phase of the rolling-cleaning procedure lasts for between 25 and 30 days.

13. A long-term maintenance cleaning procedure according to claim 1, wherein the first controlled phase of the rolling-cleaning procedure lasts for 28 days.

14. A long-term maintenance cleaning procedure according to claim 1, wherein the cleaning period of the pre-clean procedure is between 6 and 12 hours.

15. A long-term maintenance cleaning procedure according to claim 1, wherein the cleaning period of the pre-clean procedure is 12 hours.

* * * * *